(No Model.)
E. F. FUNK.
CALF FEEDER.
No. 336,225.  Patented Feb. 16, 1886.
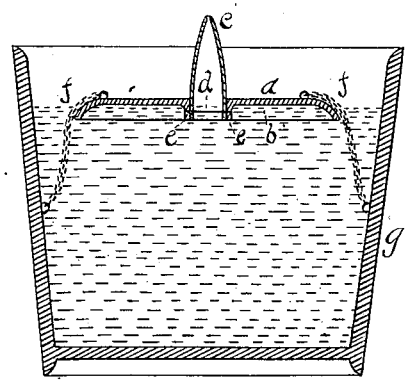
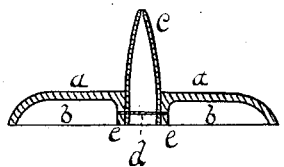
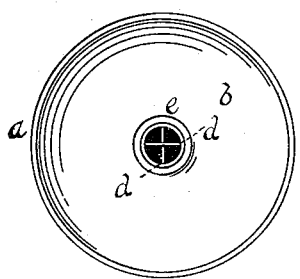
WITNESSES
J. D. Walker
C. C. Clark
INVENTOR
E. F. FUNK
By L. P. Graham
atty.

UNITED STATES PATENT OFFICE.

EDWARD F. FUNK, OF DECATUR, ILLINOIS.

CALF-FEEDER.

SPECIFICATION forming part of Letters Patent No. 336,225, dated February 16, 1886.

Application filed April 18, 1885. Serial No. 162,646. (No model.)

*To all whom it may concern:*

Be it known that I, EDWARD F. FUNK, a resident of Decatur, in the county of Macon and State of Illinois, have invented certain new and useful Improvements in Calf-Feeders, of which the following is a specification.

My invention relates to that class of calf-feeders in which the milk is held in a suitable vessel and drawn through a nipple attached to a floating disk.

In such feeders, as heretofore constructed, there has been nothing to prevent the calf from throwing the feeder out of the bucket, and the liability of the nipple to become obstructed has not been provided against.

To overcome these imperfections and to provide a superior means of attaching the nipple to the float is the object of my invention.

In the drawings accompanying and forming a part of this specification, Figure 1 is a central vertical section of my device ready for use. Fig. 2 is a central vertical section of the feeder detached from the bucket, and Fig. 3 is a bottom view of the float.

$a$ is the float.

$b$ is a concavity in the bottom of the float.

$c$ is the nipple.

$d$ are cross-bars that secure the nipple to the float, and act as guards to prevent the nipple from becoming clogged.

$e$ is a downward projection of the float, that provides a suitable point of attachment for the nipple.

$ff$ are chains attached to the float and to the inside of the bucket at its vertical center.

In constructing my device the float is formed with concavity $b$ and projection $e$, and the nipple is placed in position, as shown, and secured by cross-bars $d\ d$.

In operation the float is placed in the feed at such an angle that the air is expelled from the concavity, and the chains are so secured that the float may move freely from the top to the bottom of the bucket. Any attempt to draw the float from the milk will be counteracted by the suction of the concavity $b$, and after the milk is exhausted the chains effectually prevent displacement. In case of mixed feed being substituted for pure milk, the cross-bars will prevent clogging in the nipple, and said bars also prevent the lower end of said nipple from collapsing when suction is applied to the same.

I claim as new and desire to secure by Letters Patent—

1. The combination, in a calf-feeder, of a float concaved on its lower side and provided with a tubular central downward extension, a nipple extended through the float and through the tubular extension, and cross-bars that pass through the tubular extension and the nipple, substantially as and for the purpose set forth.

2. The combination, in a calf-feeder, of a receptacle for the milk, a float, a nipple, and chains extending from the float to the vertical center of the milk-receptacle, substantially as and for the purpose set forth.

In testimony whereof I sign my name in the presence of two subscribing witnesses.

EDWARD F. FUNK.

Witnesses:
C. C. CLARK,
JOHN N. BILLS.